United States Patent [19]

Morooka

[11] Patent Number: 5,161,489
[45] Date of Patent: Nov. 10, 1992

[54] REVERSIBLE ENGINE
[75] Inventor: Isao Morooka, Tokyo, Japan
[73] Assignee: Komatsu Zenoah Company, Tokyo, Japan
[21] Appl. No.: 465,268
[22] PCT Filed: Jun. 27, 1988
[86] PCT No.: PCT/JP88/00644
  § 371 Date: Jun. 11, 1990
  § 102(e) Date: Jun. 11, 1990
[87] PCT Pub. No.: WO89/01570
  PCT Pub. Date: Feb. 23, 1989

[30] Foreign Application Priority Data
  Aug. 13, 1987 [JP] Japan ............................ 62-123087
  May 13, 1988 [JP] Japan ............................ 63-114951

[51] Int. Cl.$^5$ ..................... F01L 13/02; F02D 27/00
[52] U.S. Cl. ........................................ 123/41 E
[58] Field of Search ............ 123/41 E, 41 R, 65 R, 123/149 B

[56] References Cited

U.S. PATENT DOCUMENTS 3,088,445 5/1963 Gardner ............... 123/41 R
3,598,098 8/1971 Sohner et al. ........ 123/41 E
5,036,802 8/1991 D'Amours ........... 123/41 E

FOREIGN PATENT DOCUMENTS 38-13110 7/1963 Japan .
38-13131 7/1963 Japan .
50-225 1/1975 Japan .
53-18656 6/1978 Japan .
61-40463 2/1986 Japan .

Primary Examiner—David A. Okonsky
Attorney, Agent, or Firm—Weiser & Stapler

[57] ABSTRACT

To change a rotational direction of a working apparatus such as a nut runner, rotational positions of a crankshaft at the highest voltages of primary currents in normal and reverse rotating operations are symmetrically arranged in relation to a rotational position corresponding the top dead center of a piston, and the rotational positions of the highest voltages are set before the rotational position corresponding the top dead center of the piston. In rotating the engine either in the normal or the reverse direction, the voltage of a primary current of an electromotive coil 97 reaches the highest value at a predetermined rotational position before the top dead center of the piston 7. An ignition unit 177 detects that a predetermined voltage close to the highest voltage is attained or that a predetermined voltage drop from the highest voltage has occurred, to short-circuit the primary current and generate a high-voltage current in a secondary circuit. The high-voltage current is discharged from an ignition plug 45. Since ignition timings are set at symmetrical positions before the top dead center in both the normal and reverse rotations, there is no need to adjust the ignition timings depending on the rotational direction.

12 Claims, 8 Drawing Sheets

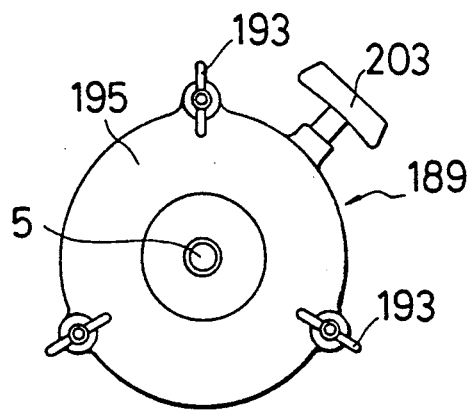
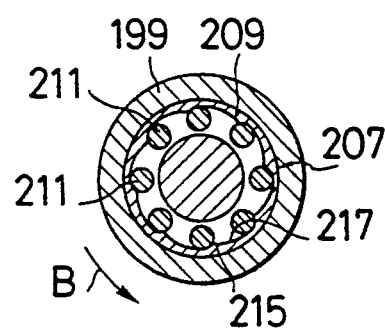
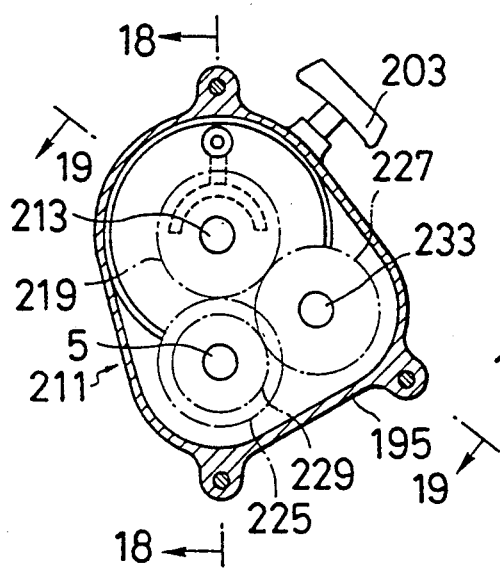
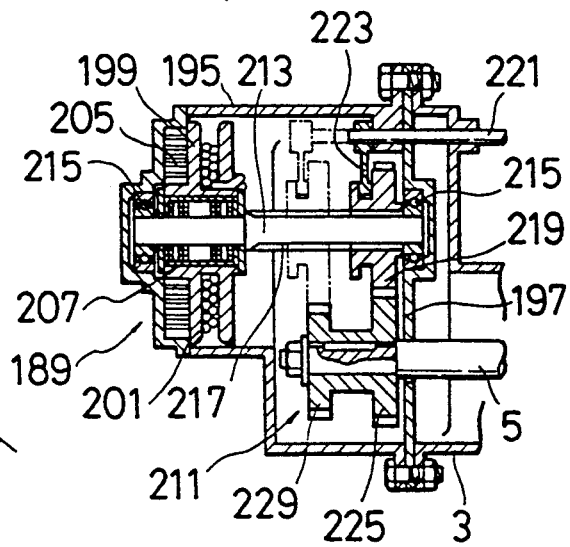
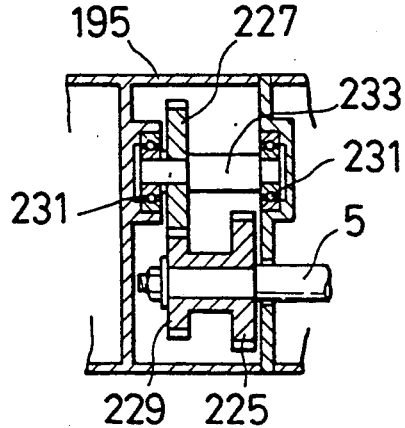

REVERSIBLE ENGINE

TECHNICAL FIELD

The present invention relates to a reversible engine in which a primary current is generated in an electromotive coil by being induced by a magnet which is rotated in accordance with rotation of a crank shaft, and the primary current is increased in its voltage by an ignition coil to ignite the engine.

BACKGROUND

Conventionally, in such a reversible engine, a primary current is short-circuited at the highest voltage thereof to induce a high voltage secondary current in an ignition coil, and the secondary current is discharged from an ignition plug. This ignition timing is selected to be a position that is before a piston reaches a top dead center, which corresponds to a rotational position of the crankshaft at a predetermined angle before the top dead center of the piston. In this case, a voltage curve shows, as indicated with a continuous line in FIG. 10 for example, the highest voltage at a position of angle $\theta 1$ before a top dead center 0, and the negative lowest voltage at a position of angle $\theta 2$ after the top dead center. In this case, an angle "$\theta 1 + \theta 2$" is determined by the structure of a magnet and an electromotive coil. The angle $\theta 1$ shall be set to a predetermined value in accordance with a predetermined ignition timing due to the performance of the engine. On the other hand, the angle $\theta 2$ has no influence on the performance, so that there is no need to particularly set the angle $\theta 2$ and, therefore, no consideration is made on the angle $\theta 2$. If this engine is reversely rotated, its voltage curve shows, as indicated with a dotted line in FIG. 10, the highest voltage at a position of angle $\theta 2$ before the top dead center and the negative lowest voltage at a position of angle 81 after the top dead center. Therefore, if the engine is simply rotated reversely, a timing of the highest voltage will not be proper so that it may not be ignited at a correct timing. Namely, the engine cannot be reversely rotated under this state.

Generally, depending on the kind of work, a working shaft shall be rotated normally or reversely. For example, in installing posts of transmission lines of electric facilities, many bolts and nuts are used. To fasten the nuts, a nut runner is used. If the nut runner is of electric type, a cord for a motor may hinder the work so that it may be advantageous to use an engine as a driving source. In fastening and unfastening the nuts, rotation of the nut runner shall be switched to normal or reverse rotation. In this case, it is generally difficult, as described in the above, to change the rotational direction by the engine itself. Therefore, a separate normal-reverse switching unit is needed. However, the unit may complicate the structure, increase the cost, and make heavier the weight to prevent the nut runner, a portable working machine, from being used at a high place.

DISCLOSURE OF THE INVENTION

According to the present invention, rotational positions of a crankshaft in both normal and reverse operations with a primary current at the highest voltage are symmetrical in relation to the rotational position of a top dead center of a piston, and the rotational position where the highest voltage occurs is set before the rotational position of the top dead center of the piston. As a result, an engine can be switched to normal rotation or to reverse rotation with a simple mechanism and without providing a separate normal-reverse switching unit.

BRIEF DESCRIPTION OF THE DRAWINGS

FIG. 15 is a front view showing essential part;

FIG. 16 is a sectional front view showing a one-way clutch;

FIG. 17 is a front view showing essential part of still another embodiment;

FIG. 18 is a sectional side view taken along a line 18—18 of FIG. 17; and

FIG. 19 is a sectional side view taken along a line —19 of FIG. 17.

PREFERRED EMBODIMENTS OF THE INVENTION

Figure 1:
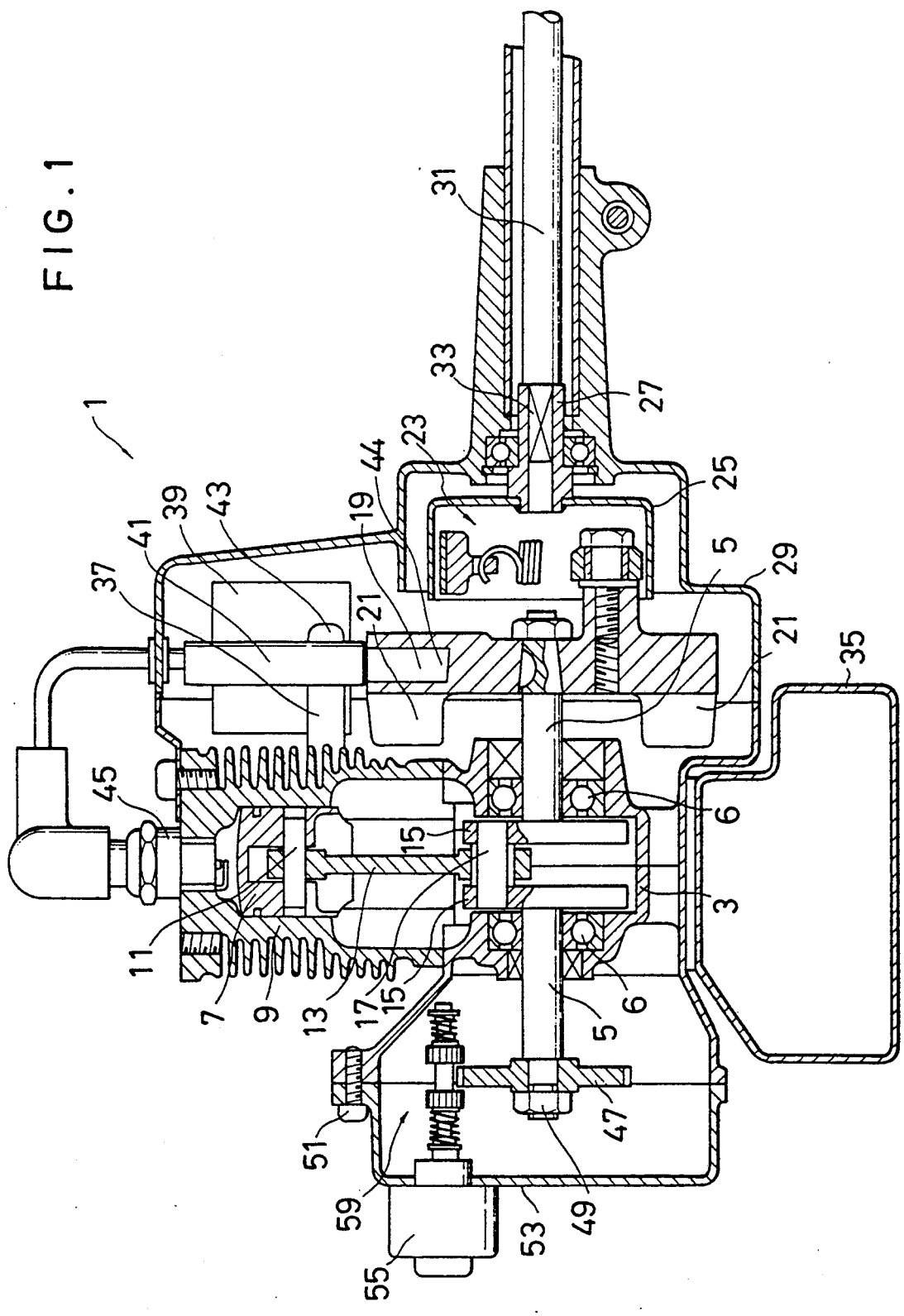
FIG. 1 is a sectional side view showing an embodiment of the present invention.
Figure 2:
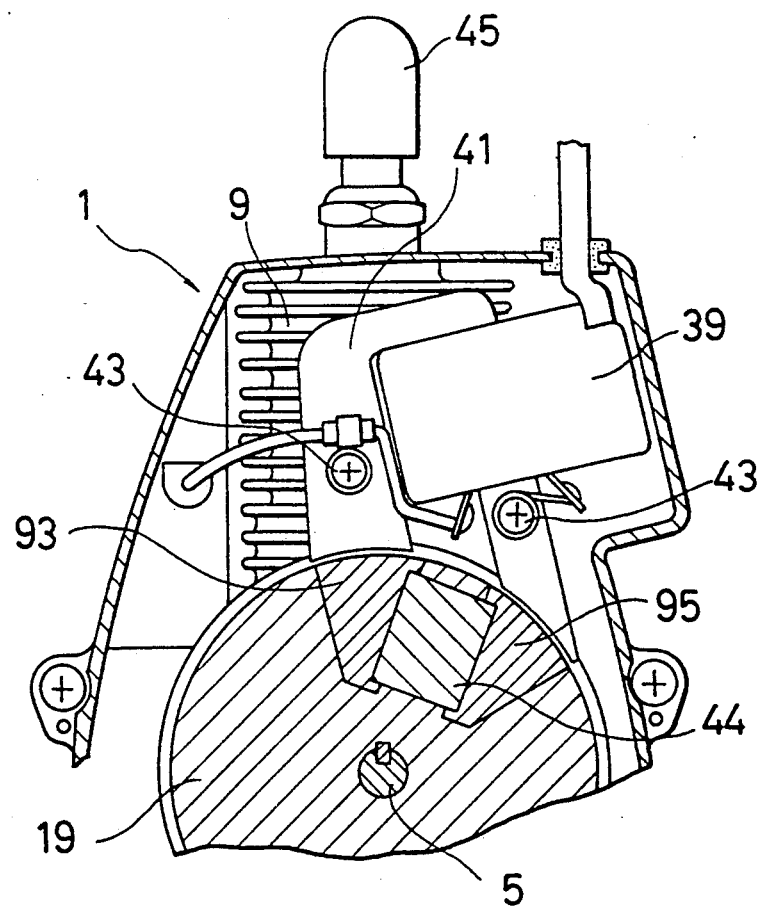
FIG. 2 is a sectional front view showing the essential part thereof.
Figure 3:
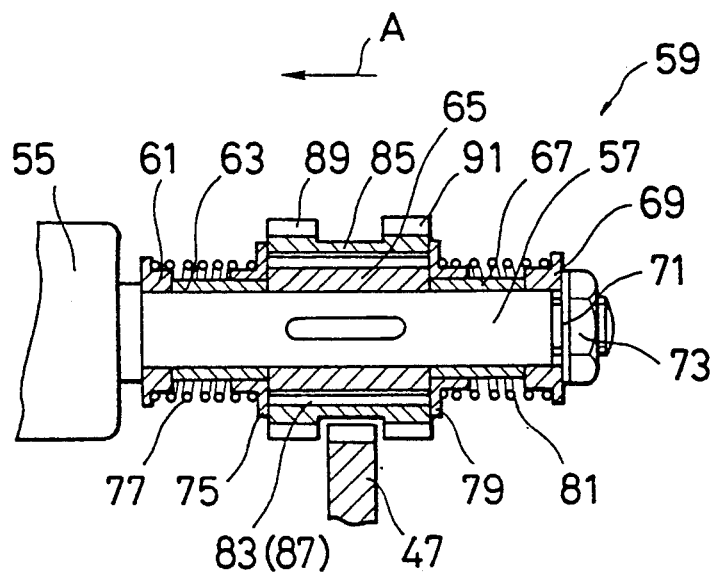
FIG. 3 is a sectional side view showing a clutch portion of the embodiment.
Figure 4:
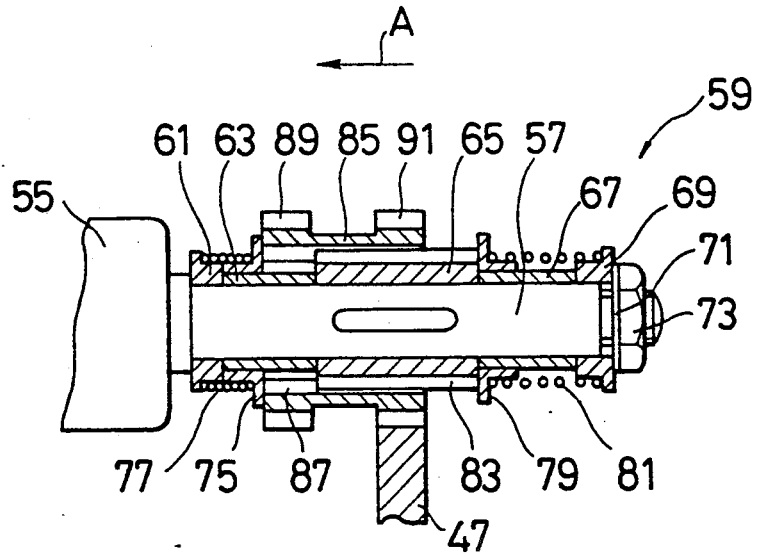
FIG. 4 is a sectional side view showing the clutch portion under another state.

An embodiment of the present invention will be described in detail with reference to the drawings.

In FIGS. 1 to 11, an engine 1 is constituted as follows. Namely, in a crankcase 3, a crankshaft 5 is rotatably supported through bearings 6. At the upper part of the crankcase 3, there is fixed a cylinder 9 in which a piston 7 is slidably fitted. One end of a connection rod 13 is connected to the piston 7 through a piston pin 11, while the other end thereof is connected to a crank pin 17 which is fixed to a crank arm 15 of the crankshaft 5. On one end of the crankshaft 5, a magnet wheel 19 is fixed. On the inner side face of the magnet wheel 19, fans 21 are fixed. On the outer side face of the magnet wheel 19, a centrifugal clutch 23 is mounted. In the vicinity of the outer periphery of the centrifugal clutch 23, there is disposed a clutch drum 25 whose boss shaft 27 is rotatably supported by a fan case 29 that is fixed to the crankcase 5 to cover the fans 21. The boss shaft 27 engages with a square shaft portion 33 provided on one end of a transmission shaft 31. On the lower surface of the crankcase 5, a fuel tank 35 is disposed. On a bracket 37 protruding on the one side of the cylinder 9, an iron core 41 of an induction coil 39 is fixed with a screw 43. Induced by a magnet 44 embedded in the periphery of the magnet wheel 19, the induction coil 39 generates a primary current on an electromotive coil (not shown) disposed in the induction coil 39. At a position where a voltage of the primary current reaches a predetermined value close to a highest value or at a position where a voltage of the primary current is lower than the highest value to the extent of the predetermined value, the voltage is detected to short-circuit the primary current such that a high-voltage current is generated in an ignition coil (not shown) arranged in the induction coil 39. The high-voltage current is discharged from an ignition plug 45 disposed at the top of the cylinder 9 to ignite. The position where the primary current reaches the highest voltage is set before a top dead center of the piston 7 at a predetermined rotational angle of the crankshaft 5. When the engine 1 is reversely rotated, a position generating the highest voltage generated in a primary circuit is set before the position of the top dead center at the same angle as that for the normal rotation. Namely, ignition timings in the normal and reverse rotations are set to be the same. Therefore, the engine can be rotated in toward the normal and reverse directions.

On the other end of the crankshaft 5, a large gear 47 is fixed with a nut 49. To the crankcase 3, there is fixed a cover 53 with a screw 51 so as to cover the large gear 47. On the cover 53, there is fixed a reversible motor 55. On a rotary shaft 57 of the motor 55, a clutch 59 is disposed. The clutch 59 is constituted as follows. Namely, around the rotary shaft 57, there are arranged a spring receiver 61, a collar 63, a threaded cylinder 65, a collar 67 and a spring receiver 69 side by side, that are fixed through a washer 71 by a nut 73 screwed to the top end of the shaft 57. On the periphery of the collar 63, a spring receiver 75 is slidably arranged, regulated for its movement by a side face of the threaded cylinder 65 and a side face of the spring receiver 61, and pushed by a spring 77 toward the threaded cylinder 65. On the periphery of the collar 67, a spring seat 79 is slidably arranged. The movement of the spring seat 79 is regulated between the side face of the threaded cylinder 65 and the side face of the spring receiver 69, and biased by a spring 81 toward the threaded cylinder 65. On the periphery of the threaded cylinder 65, a male thread 83 is formed so as to engage with a female thread 87 of a gear cylinder 85. On the outer periphery of the gear cylinder 85, there are formed two small gears 89 and 91 side by side in the vicinity of both sides of the large gear 47. By sliding the gear cylinder 85, one of the small gears alternatively engages with the large gear 47. The large gear 47 and small gears 89 and 91 are constituted as helical gears, respectively. The threads of the threaded cylinder 65 and the gear cylinder are formed such that the gear cylinder 85 is biased toward the axial direction thereof when a torque is transmitted from the small gear 89 or 91 to the large gear 47. The thread direction of the male thread 83 and female thread 87 is constituted oppositely to the thread direction of the small gears 89 and 91. Namely, supposing a normal rotation of the engine is in the clockwise direction seen from an arrow marked with A in FIGS. 3 and 4, the male thread 83 and female thread 87 have left-handed threads, the small gears 89 and 91 have right-handed threads, and the large gear 47 has left-handed thread.

Figure 5:
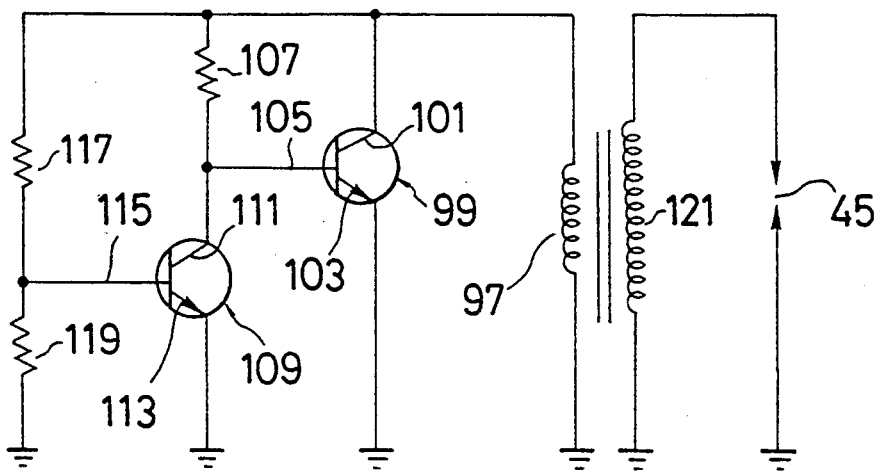
FIG. 5 is an explanatory view of an electric circuit.

On the outer periphery of the magnet wheel 19, there are exposed at a proper interval one surface of each of iron pole segments 93 and 95 which contact with both poles of the embedded magnet 44, respectively. Both ends of the iron core 41 of the induction coil 39 face the pole segments 93 and 95 according to the rotation of the magnet wheel 19 to generate a primary current on an electromotive coil 97 in the induction coil 39. On voltage curves of primary currents shown in FIG. 6, a rotational position $\theta 1$ of the crankshaft at a highest voltage in normal rotation (continuous line) and a rotational position $\theta 2$ of the crankshaft at a highest voltage in reverse rotation (dotted line) are symmetrical in relation to a rotational position O of a top dead center. The constitutions and sizes of the magnet and the iron core of electromotive coil are selected to realize the above-mentioned curves. For example, both the poles of the iron core 41 are set to match with positions of the iron segments 93 and 95, and a rotational position of the crankshaft 5 (a rotational position of a flywheel 19) is set to match with a position of the top dead center of the piston 7, in where the voltage of the primary current will be zero. When a middle position between the iron segments 93 and 95 passes one downstream pole in rotational direction, of the iron core 41, a rotational angle of the crankshaft will be $-\theta 1$, and a voltage of the primary current will be highest. When it passes the other pole of the iron core 41, a rotational angle of the crankshaft will be $\theta 2$, and a voltage of the primary current will be the negative lowest. If the rotation is reversed, the primary current will be highest at the rotation angle $-\theta 2$ of the crankshaft, and will be lowest at the angle $\theta 1$. In this case, values of the angles $\theta 1$ and $\theta 2$ are equal to each other, and the rotational positions of the crankshaft at the highest voltages of the primary current in the normal and the reverse directions are symmetrical in relation to the top dead center. FIG. 5 is a view showing an electric circuit. To both poles of the electromotive coil 97, a collector 101 and an emitter 103 of a transistor 99 are connected, respectively. A base 105 of the transistor 109 (having a collector 111 and an emitter 113) that connect both the poles of the electromotive coil 97 in series. A base 115 of the transistor 109 is connected between resistors 117 and 119 that connect both the poles of the coil 97 in series. In the induction coil 39, an ignition coil 121 is incorporated together with the electromotive coil 97. Induced by the electromotive coil 97, the ignition coil generates a high-voltage current to be discharged from the ignition plug 45.

Figure 6:
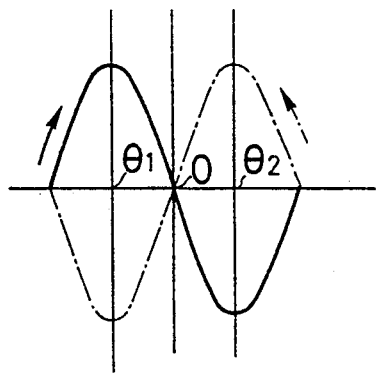
FIG. 6 is a voltage curve showing a primary current.
Figure 7:
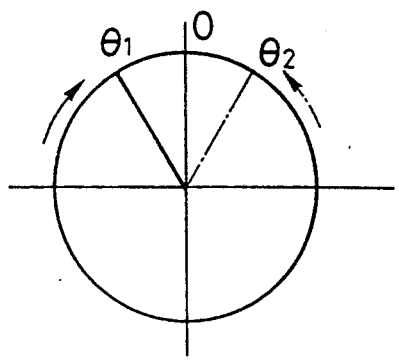
FIG. 7 is an explanatory view showing rotational positions of a crankshaft.

In this embodiment, when the engine 1 is normally rotated, a primary current is generated in accordance with the rotation of the magnet wheel 19, whose voltage changes as indicated with the continuous line of FIG. 6. As the voltage rises, the potential difference occurs between the base 105 and emitter 103 of the transistor 99 to operate the transistor 99. As a result, the collector 101 and emitter 103 become conductive to flow a current to the primary circuit. If the voltage reaches a predetermined voltage close to the highest voltage and the potential difference of the base 115 and emitter 113 of the transistor 109 reaches a predetermined value, the transistor 109 starts to operate to make the collector 111 and emitter 113 conductive. As a result, the base 105 and emitter 103 of the transistor 99 will have the same potential to disconnect the collector 101 and emitter 103. Then, a current in the primary circuit, suddenly changes to generate a high-voltage current in the ignition coil 121. The high-voltage current is discharged from the ignition plug 45. When the engine 1 is reversely rotated, the similar operation is repeated to discharge a high-voltage current. A rotational position of the crankshaft at the highest voltage in the reverse rotation and a rotational position of the same at the highest voltage in the normal rotation are symmetrical in relation to the top dead center of the piston, so that ignition timings in the normal and reverse rotations are the same.

Figure 8:
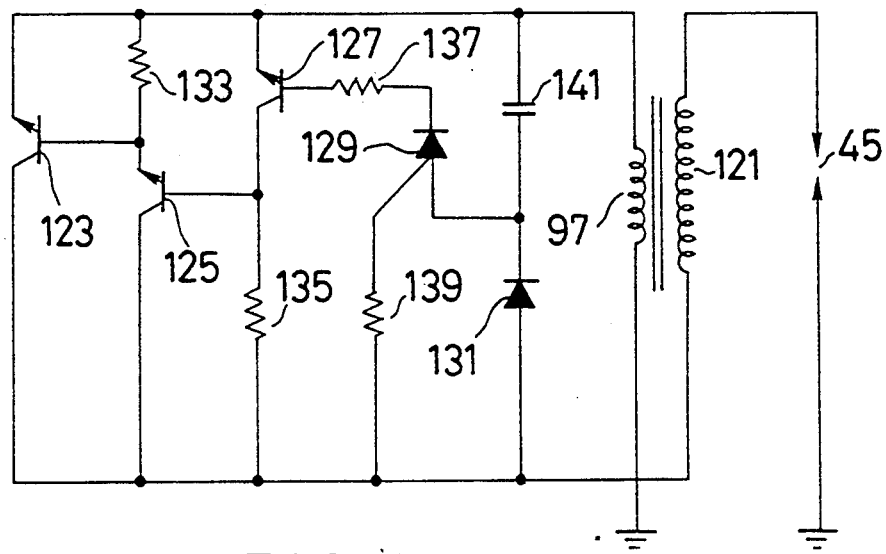
FIG. 8 is an explanatory view showing an electric circuit according to a second embodiment.
Figure 9:
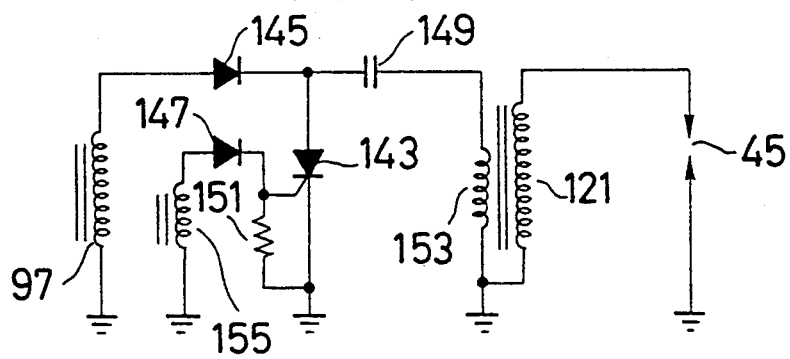
FIG. 9 is an explanatory view showing an electric circuit according to a third embodiment.
Figure 10:
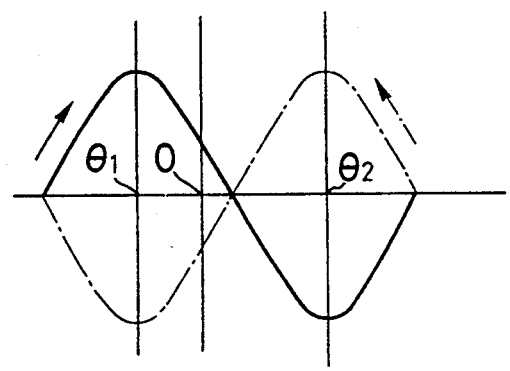
FIG. 10 is a voltage curve showing a primary current according to a prior art example.
Figure 11:
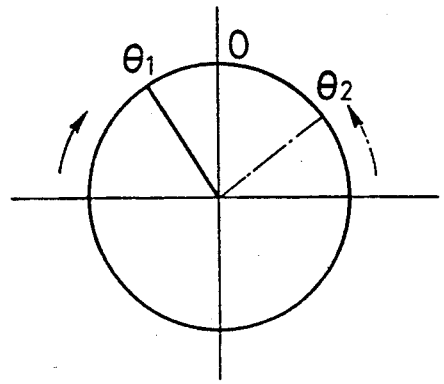
FIG. 11 is an explanatory view showing rotational positions of a crankshaft of the prior art example.

In connection with the constitution of the electric circuit, the present invention is not limited to the above-mentioned embodiment. For example, transistors 123, 125 and 127, a thyristor 129, a diode 131, resistors 133, 135, 137 and 139 and a capacitor 141 may be arranged in a primary circuit as shown in FIG. 8. Namely, as a voltage of the primary circuit increases, the capacitor 141 is charged. When the voltage passes a highest voltage position, the voltage begin to drop. When the difference of the voltage and the highest voltage (a voltage charged in the capacitor 141) becomes equal to a predetermined potential difference, the thyristor 125 is operated so as to disconnect the primary circuit which is in a connected state by the transistor 123. Then, a high-voltage secondary current is generated, which is discharged from the ignition plug 45. As shown in FIG. 9, the primary circuit may comprise a thyristor 143, diodes 145 and 147, a capacitor 149, a resistor 151, the electromotive coil 97 incorporated in the induction coil 39, a primary coil 153, an ignition coil 121 and a pulser coil 155, that are arranged and connected as shown in the figure. Electricity charged in the capacitor 149 according to increase of the voltage of a primary current is discharged by applying a pulse voltage from the pulser coil 155 to a gate of the thyristor 143 to operate the thyristor 143 and short-circuit the primary circuit. Then, a current in the primary coil 153 suddenly drops to generate a high-voltage current in the ignition coil 121, and the high-voltage current is discharged from the ignition plug 45. The pulser coil 155 is incorporated in the induction coil 39 and activated by the magnet 44 to generate electricity at a predetermined ignition timing in both the normal and reverse rotations.

When the rotary shaft of the motor 55 is normally rotated (in the clockwise direction seen from the arrow mark A of FIG. 3 of this embodiment) with a battery (not shown), the threaded cylinder 65 suddenly starts to rotate together with the rotary shaft 57. Then, since the gear cylinder 85 tends to be stationary due to its inertia, the gear cylinder 85 follows the thread direction of the male thread 83 to move in the direction of arrow A against the spring 77. Then, the small gear 91 engages with the large gear 47, and the gear cylinder 85 is pushed in the direction of arrow A due to the thread angle of the small gear 91 to be held in a state shown in FIG. 4. When the large gear 47 and the crankshaft 5 rotate to start the engine 1, the motor 55 is stopped. Then, a rotational speed of the large gear 47 exceeds that of the small gear 91, so that load is reversely applied from the large gear 47 to the small gear 91. Therefore, the small gear 91 follows the thread angle of the male thread 83 to move from the position of FIG. 4 in a direction opposite to the direction of arrow A, and returns to a position shown in FIG. 3. Thus, the engine 1 rotates normally, then the clutch 59 being disconnected. On the contrary, if the motor 55 is rotated reversely, the gear cylinder 85 moves in a direction opposite to the direction of arrow A of FIG. 3 so that the small gear 89 may engage with the large gear 47 to turn the crankshaft 5 reversely. When the engine 1 is started, the gear cylinder 85 moves in the direction of arrow A to return to the position of FIG. 3.

According to the present invention, a special normal-reverse switching unit is not needed and with a simple structure, an engine can be switched to normal or reverse rotation. In addition, the weight can be reduced to realize a portable working machine which is easy to handle.

Figure 12:
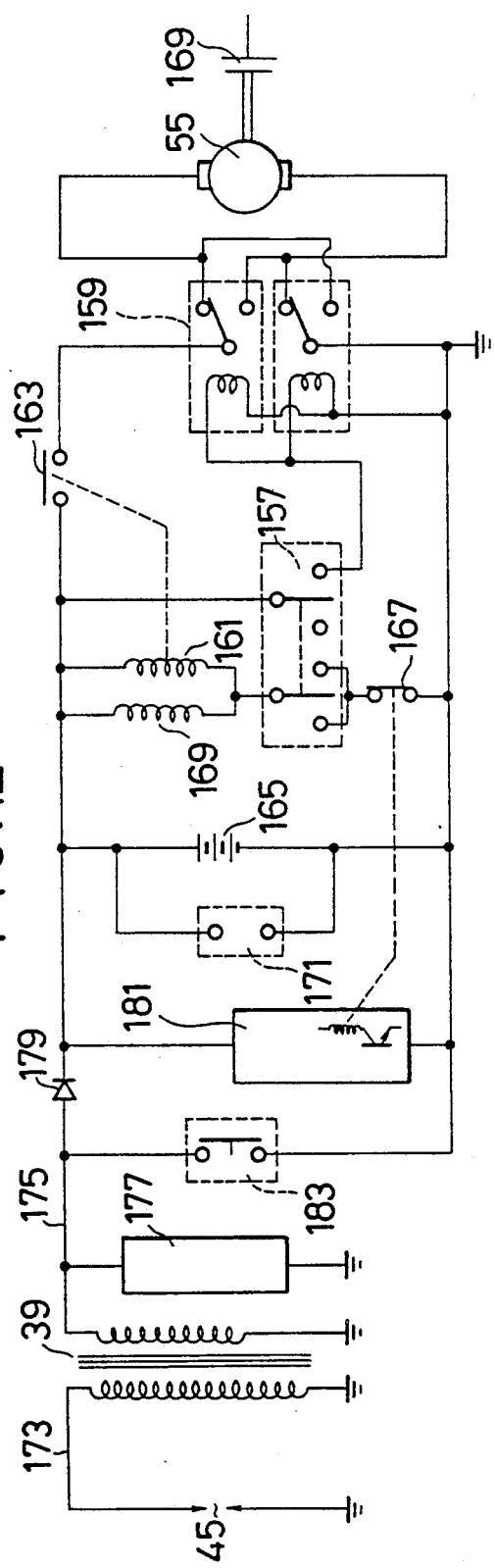
FIG. 12 is an explanatory view showing an electric circuit of a rotation detector.

FIG. 12 shows an electric circuit for normal and reverse rotations which uses a rotation detector to disconnect an electric circuit of a starter motor after an engine is started. After the engine is started, if a switch for turning on the starter motor is touched, it will damage a clutch. Particularly, if a switch for reverse rotation is touched, abnormal load may be applied to the starter motor to burn the starter motor. The circuit shown in the figure prevents such a burning of the motor. In this embodiment, in addition to the previously explained clutch 59, an electromagnetic clutch is used. This arrangement will be explained. The motor 55 is connected to a switching relay 159 which is of a neutral position returning type and switched by a transfer switch 157. The transfer switch 157 is constituted as a neutral position returning type, which enabling normal and reverse starts. The motor is connected to a battery 165 via a contact 163 of a switching relay 161. The transfer switch 157 connects a rotation detecting contact 167 and the relay 161 to the battery 165 in series. In parallel with the relay 161, an electromagnetic clutch 169 is connected. To the battery 165, there is connected a charging connector 171 for connection to a power source. In a secondary circuit 173 of the induction coil 39 which is responsive to the magnet 44 embedded in the periphery of the magnet wheel 19 to generate electricity, there is provided with the ignition plug 45. A primary circuit 175 is connected to an ignition unit 177 as well as to the battery 165 via a rectifying diode 179. When a primary voltage reaches a predetermined value, the ignition unit 177 short-circuits the primary circuit 175 to generate a high voltage in the secondary circuit 173, so that the ignition plug 45 discharges the high voltage. The primary circuit 175 is connected to a rotation detector 181 to measure current pulses generated in the primary circuit for every rotation of the engine. When the number of pulses within a predetermined time period reaches a predetermined value, i.e., when the engine attains a predetermined rotation speed, the rotation detecting contact 167 is disconnected. In addition, in order to short-circuit the primary circuit 175, there is arranged an engine stop switch 183. The rotation detector 181 may be arranged so as to detect a voltage generated in the primary circuit according to the rotation of the engine to disconnect the rotation detecting contact 167.

With the above-mentioned arrangement, in starting the engine, the transfer switch 157 is connected for normal rotation to energize the relay 161 and connect the contact 163. The, the electromagnetic clutch 169 is activated. At the same time, the switching relay 159 is connected to the normal rotation circuit, and the motor 55 is normally rotated to start the engine 1 in the normal rotating direction. After the engine 1 starts to rotate, the electromotive coil 97 responds to the magnet wheel 19 to generate a voltage so that the ignition unit 177 may cause the ignition plug 45 to discharge electricity. As a result, the cylinder continues to explode. Further, the rotation detector 181 detects a rotation speed to disconnect the rotation detecting contact 167 as well as disconnecting the electromagnetic clutch 169. At the same time, a current to the relay 161 is stopped to disconnect the contact 163 to stop the motor 55. Then, the transfer switch 157 and switching relay 159 return to their neutral positions, respectively. While the engine 1 is rotating, the motor 55 does not rotate. However, if the engine 1 stops, the rotation detecting contact 167 is connected to return to an original state. In reverse rotation, the transfer switch 157 will be operated for reverse rotation to carry out the similar operations.

Figure 13:
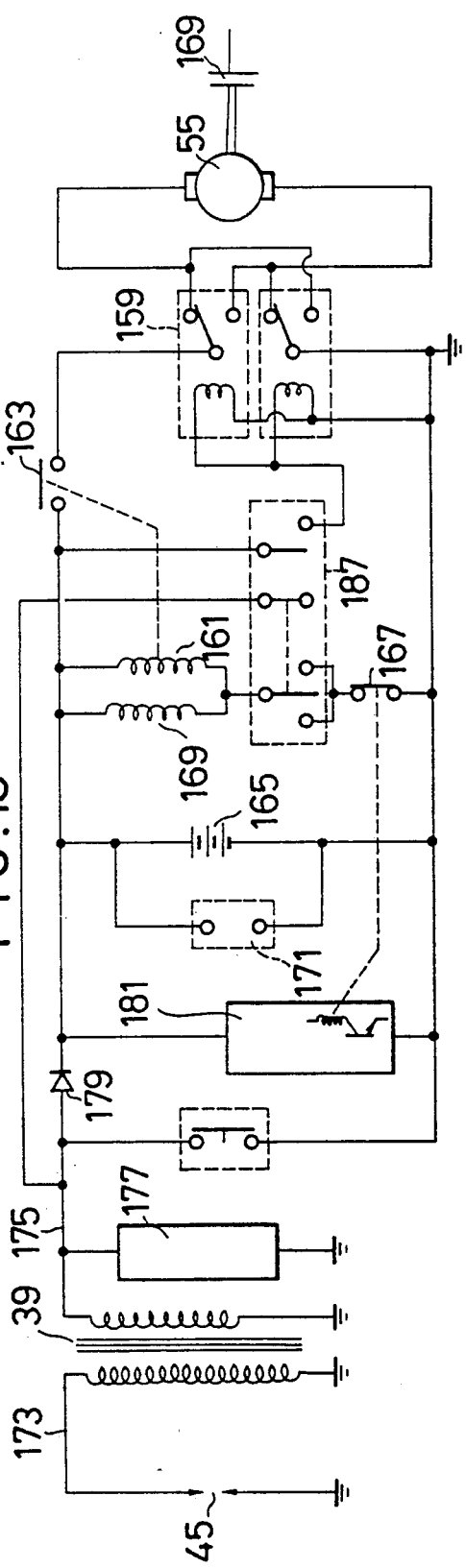
FIG. 13 is an explanatory view showing an electric circuit of another embodiment of the rotation detector.
Figure 14:
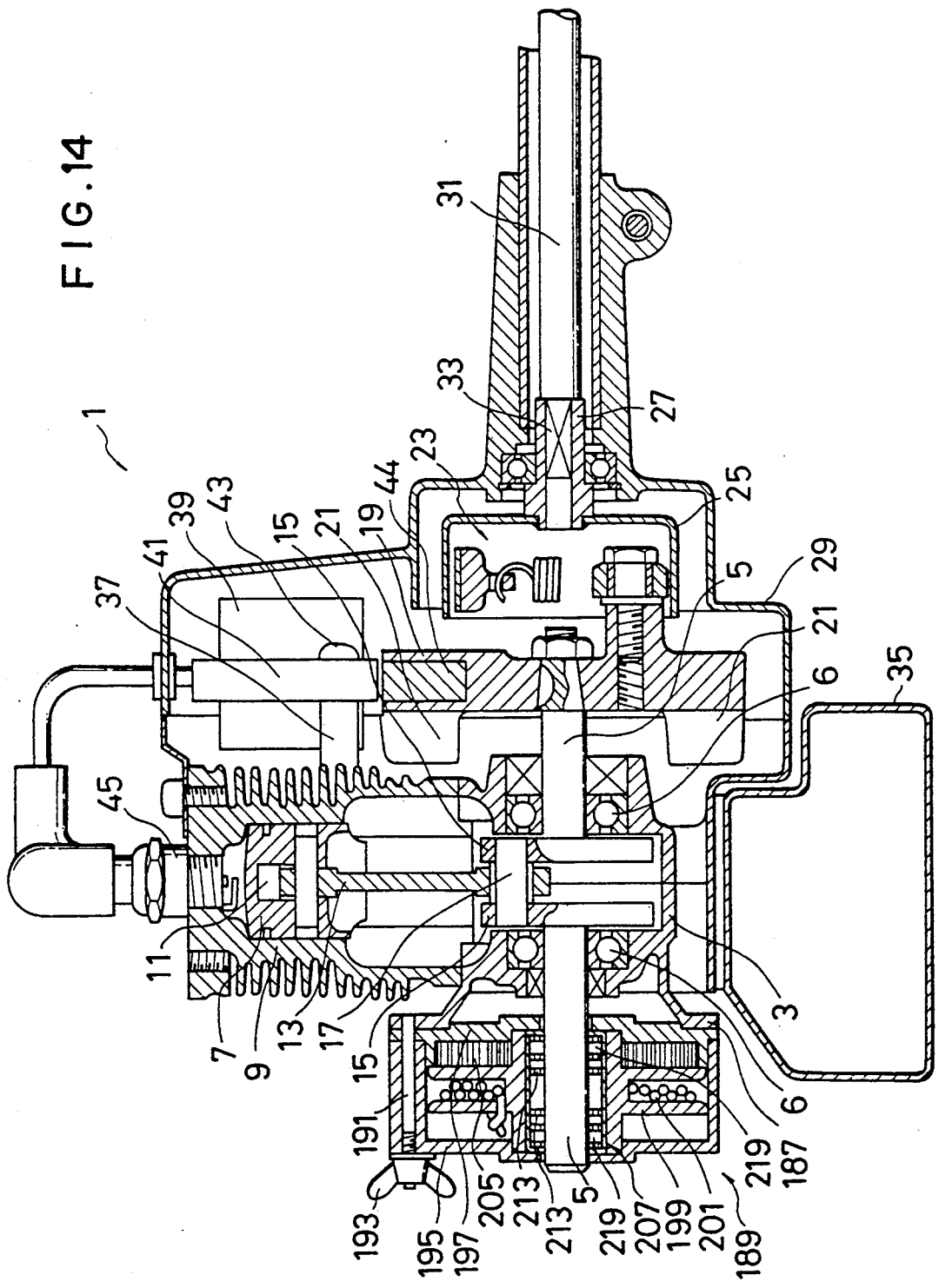
FIG. 14 is a sectional side view showing a reversible engine provided with a recoil starter.

In FIG. 13, there is arranged a transfer switch 187 which takes three positions for normal rotation, stop and reverse rotation. At the stop positions, the engine is stopped. Therefore, a separate switch for stopping the engine is not needed so that it is possible to simplify the structure and make the operation easier.

In FIGS. 14 to 19, a recoil starter is used instead of the above-mentioned motor 55 to eliminate expensive and heavy weight components such as the motor and battery, thereby reducing the cost and weight.

Parts represented with the same numerals as those of FIG. 1 are like components. This arrangement will be explained. In the vicinity of one end of a crankshaft 5, a flange 187 is formed on an end face of a crankcase 3 to which a recoil starter 189 is fitted with a bolt 191 and a wing nut 193 such that the recoil starter can turn reversely. The recoil starter 189 is constituted as follows. Namely, a case body 195 is provided with a lid portion 197 which is fixed with screws (not shown). Inside the case body, a reel 199 is rotatably supported. Around the reel 199, one end of a starter cord 201 is wound. The other end of the starter cord passes through a side end portion of the case body 195 and is connected to a starter handle 203. Between the reel 199 and the lid portion 197, there is disposed a spiral spring 205 so as to pull the starter cord 201 in a winding direction thereof. The inner diameter of the reel 199 engages with a one-way clutch 207 which engages with the crankshaft 5 in one direction. The one-way clutch 207 comprises a cylindrical case 209 pressurizedly fitted into an inner hole of the reel 199, and a plurality of rollers 211 which are disposed in the cylindrical case 209 at predetermined intervals and held between holding rings 213. The inner surface of the cylindrical case 209 is provided with projections 215. When the crankshaft 5 rotates relative to the cylindrical case 209 toward slant surfaces 217 formed on one side of each of the projections 215, the rollers 211 come onto the slant surfaces 217 and are pushed between the crankshaft 5 and the cylindrical case 209 to stop the relative movement. If the crankshaft rotates reversely, the rollers 211 are released from the slant surfaces 217 to rotate freely. On outer sides of both ends of the rollers 211, there are disposed bearing rollers 219 which engage with inner surface of the cylindrical case 209 to support the crankshaft 5.

With the above-mentioned arrangement, in starting the engine, when the starter handle 203 is grasped and strongly pulled, the reel 199 is rotated in the direction of arrow B of FIG. 16 against the biasing force of the spiral spring 205. The rollers 211 contact with the periphery of the crankshaft 5 rotating relatively in the opposite direction, and roll along the slant surfaces 215. The rollers 211 are pushed and held between the slant surfaces 215 and the crankshaft 5 so that the crankshaft 5 may turn together with the reel 199 through the rollers 211, thereby starting the engine 1. After the engine 1 is started, a rotational speed of the crankshaft 5 exceeds that of the reel 199, so that the cylindrical case 209 may rotate relative to the crankshaft 5 in a direction opposite to the direction of arrow B. Then, the rollers 211 are released from the slant surfaces 217 to be free. By releasing the hand pulling the starter handle 203, the spiral spring 205 causes the reel 199 to be rewound, so that the reel 199 returns to its original posture.

In turning the engine 1 reversely, the wing nut 193 is removed to remove the recoil starter 189 from the bolt 191 which fixes the recoil starter to the flange 187. Then, the recoil starter is inverted and again fitted to the bolt 191 of the flange 187 and fixed with the wing nut 193. Namely, the one-way clutch 207 is fitted to the crankshaft 5 reversely. Therefore, under this state, the starter handle 203 is pulled to rotate the crankshaft 5 in the direction opposite to the previously explained direction, and the engine 1 is started toward that opposite direction. Irrespective of the rotational direction of the engine 1, if a rotational speed of the engine exceeds a predetermined value, a centrifugal clutch 23 engages with a clutch drum 25 to rotate a transmission shaft 31 and drive a working unit.

FIGS. 17 to 19 show another embodiment. Between a recoil starter 189 and a crankshaft 5, there is interposed a normal-reverse switching unit 211. Namely, in a case body 195 fixed to a crankcase 3, a starter shaft 213 engaging with a one-way clutch 107 of a recoil starter 189 is axially supported by bearings 215. A spline 217 formed on the periphery of the shaft 213 engages with a switching gear 219 which is slidable back and forth and engages with a fork 223 fixed to an operation rod 221. The switching gear 219 engages with a normal rotation gear 225 fixed to the crankshaft 5. When the switching gear 219 is moved to the reverse rotation direction, it engages through an intermediate gear 227 with a reverse rotation gear 229 fixed to the crankshaft 5. The intermediate gear 227 is fixed to an intermediate shaft 233 supported by bearings 231.

With the above-mentioned arrangement, in starting the engine 1, a starter handle 203 is pulled to rotate a reel 199 so that the crankshaft 5 is normally rotated via the one-way clutch 207, starter shaft 213, switching gear 219 and normal rotation gear 225, thus starting the engine 1 in the normal direction. If the operation rod 221 is operated to move the switching gear 217 so as to engage it with the intermediate gear 227 and then the starter handle 203 is pulled, the crankshaft 5 is reversely rotated via the reel 199, one-way clutch 207, starter shaft 213, switching gear 219, intermediate gear 227 and reverse rotation gear 229, thus starting the engine 1 in the reverse direction. The normal-reverse rotation switching unit 211 transmits rotational force from the recoil starter 189 to the crankshaft 5 with small torque, so that it is possible to have a compact structure and light weight.

According to this arrangement, the normal-reverse rotation switching unit is not needed to be installed on the output side of large torque, but it is possible to installed the unit on the recoil starter side in which small torque is required in order to rotate the engine normally or reversely. Therefore, the structure of a working apparatus as a whole can be compactified and weight thereof can be lightened.

We claim:
1. A reversible engine comprising:
   a crankshaft, and a piston associated with the crankshaft;
   an ignition system which includes an electromotive coil, a magnet fixed for rotation relative to the crankshaft for generating a primary current in the electromotive coil which exhibits a voltage, and an ignition coil for increasing the voltage for discharge and ignition of the engine;

wherein rotational positions of the crankshaft for highest voltages of the primary current, in normal and reverse directions of rotation, are symmetrically arranged relative to a rotational position of the crankshaft which corresponds to a top dead center position of the piston, and wherein the rotational position for the crankshaft corresponding to the highest voltage of the primary current is set to correspond to a rotational position before the top dead center position of the piston; and a starter motor which is rotatable in normal and reverse directions and connectable to the engine through a clutch, wherein the clutch connects the starter motor and the engine in both the normal and in the reverse directions of rotation, for starting the engine, and disconnects the starter motor and the engine after the engine is started.

2. The reversible engine of claim 1, which further comprises a rotation detector for detecting rotation of the engine and for disconnecting the starter motor when the engine is rotating.

3. The reversible engine of claim 1, which further comprises a recoil starter for starting the engine by rotating the crankshaft in the normal and the reverse directions, wherein the recoil starter is connected to the crankshaft through a one-way clutch.

4. The reversible engine of claim 1, which further comprises a transfer switch for assuming and maintaining normal, stop and reverse positions for operating the starter motor, and wherein the ignition circuit is short-circuited at the stop position of the transfer switch.

5. A reversible engine including an engine cylinder and a crankshaft adapted for rotation in normal and reverse directions, comprising:

an ignition plug mounted to the engine cylinder;

a piston which reciprocates through a top dead center point and a proper ignition timing point just before the top dead center point, thereby rotating the crankshaft in the normal and the reverse directions;

a magnet having opposing magnetic poles, wherein the magnet is rotatable with the crankshaft in the normal and the reverse directions through a first rotational position, a central rotational position and a second rotational position responsive to rotation of the crankshaft, wherein the central rotational position corresponds to the top dead center point of the piston;

an electromotive coil for inductively producing a primary voltage for each of the rotational directions of the magnet responsive to magnetic flux from the magnet such that the primary voltage for rotation in the normal direction reaches a highest value at the first rotational position and the primary voltage for rotation in the reverse direction reaches a highest value at the second rotational position; and an electrical circuit electrically connected between the electromotive coil and the ignition plug for producing a spark in the ignition plug when the primary voltage substantially equals the highest value for either direction of rotation;

wherein the magnet is positioned so that the piston reaches the ignition timing point at the first rotational position for rotation in the normal direction and the second rotational position for rotation in the reverse direction; and a motor having a rotary shaft rotatable in a normal and a reverse direction for starting the engine, and a clutch for connecting the motor and the engine so that when the engine is started, the clutch connects the motor and the engine in the normal and in the reverse directions of rotation, and disconnects the motor and the engine after the engine is started.

6. The reversible engine of claim 5, wherein the opposing magnetic poles are located on a circle concentric with the crankshaft, wherein an angle is developed between the poles with respect to the axis of the crankshaft such that the angle equals the rotational angle between the first rotational position and the second rotational position with respect to the axis of the crankshaft, and wherein the first rotational position and the second rotational position are symmetrical with respect to the central rotational position.

7. The reversible engine of claim 5, wherein the clutch further comprises a driven gear on the crankshaft, for rotation in accordance with rotation of the crankshaft, and a gear cylinder having first and second gearing members and provided on a rotary shaft of the motor and axially movable between a first axial position wherein the first gearing member engages the driven gear to transmit power from the rotary shaft to the driven gear, and a second axial position wherein the second gearing member engages the driven gear to transmit power from the rotary shaft to the driven gear, wherein the gear cylinder is constructed so that when the rotary shaft rotates in the normal direction relative to the cylinder member, the cylinder member moves to the first axial position, and when the rotary shaft rotates in the reverse direction relative to the cylinder member, the cylinder member moves to the second axial position.

8. The reversible engine of claim 7, wherein the clutch further includes a threaded cylinder coaxial with the gear cylinder, wherein the threaded cylinder is slidable on the rotary shaft and inside the gear cylinder, wherein the threaded cylinder includes a male thread on an outer periphery thereof, and wherein the gear cylinder includes a female thread on an inner bore surface thereof so that the cylinder with the female thread slides along the cylinder with the male thread, along the axis of the rotary shaft, by rotation of the rotary shaft relative to the gear cylinder.

9. The reversible engine of claim 8, wherein the clutch further comprises means for axially biasing the clutch to a position between the first axial position and the second axial position, for preventing engagement of the driven gear with the first gearing member and the second gearing member.

10. The reversible engine of claim 5, which further comprises a rotation detector for detecting rotation of the crankshaft and for interrupting the motor when the rotation detector detects a started engine responsive to detected rotation of the crankshaft.

11. The reversible engine of claim 5, which further comprises a recoil starter for supplying rotating motion, a one-way clutch connected to the recoil starter for transmitting rotating motion in only one rotational direction from the recoil starter to the crankshaft, and means for controllably converting the direction of rotation of the rotating motion transmitted by the one-way clutch from one direction to the opposite direction, for application to the crankshaft.

12. The reversible engine of claim 5, which further comprises a switch for assuming stop, normal and reverse positions for operating the motor, and wherein the motor has an electrical circuit which is short-circuited to prevent the motor from operating when the switch is at the stop position.

* * * * *